(12) United States Patent
Kamruzzaman et al.

(10) Patent No.: US 10,907,610 B2
(45) Date of Patent: *Feb. 2, 2021

(54) WIND-TURBINE ROTOR BLADE, ROTOR BLADE TRAILING EDGE, METHOD FOR PRODUCING A WIND-TURBINE ROTOR BLADE, AND WIND TURBINE

(71) Applicant: WOBBEN PROPERTIES GMBH, Aurich (DE)

(72) Inventors: Mohammad Kamruzzaman, Southampton (GB); Andree Altmikus, Aurich (DE)

(73) Assignee: Wobben Properties GmbH, Aurich (DE)

( * ) Notice: Subject to any disclaimer, the term of this patent is extended or adjusted under 35 U.S.C. 154(b) by 385 days.

This patent is subject to a terminal disclaimer.

(21) Appl. No.: 15/326,423

(22) PCT Filed: Jul. 17, 2015

(86) PCT No.: PCT/EP2015/066391
§ 371 (c)(1),
(2) Date: Jan. 13, 2017

(87) PCT Pub. No.: WO2016/009037
PCT Pub. Date: Jan. 21, 2016

(65) Prior Publication Data
US 2017/0204832 A1  Jul. 20, 2017

(30) Foreign Application Priority Data

Jul. 17, 2014 (DE) .................. 10 2014 213 929

(51) Int. Cl.
F03D 1/06 (2006.01)

(52) U.S. Cl.
CPC ...... *F03D 1/0633* (2013.01); *F05B 2240/221* (2013.01); *F05B 2240/30* (2013.01);
(Continued)

(58) Field of Classification Search
CPC .... F03D 7/0228; F03D 1/0633; F03D 1/0675; F03D 7/0296
See application file for complete search history.

(56) References Cited

U.S. PATENT DOCUMENTS

| 5,088,665 A | 2/1992 | Vijgen et al. |
| 5,533,865 A | 7/1996 | Dassen et al. |

(Continued)

FOREIGN PATENT DOCUMENTS

| CN | 1918386 A | 2/2007 |
| CN | 101498276 A | 8/2009 |

(Continued)

OTHER PUBLICATIONS

Bulder et al., "Theory and User Manual BLADOPT," ECN-C-01-011, Energy Research Centre of the Netherlands ECN, Aug. 2001, 98 pages.

(Continued)

*Primary Examiner* — Courtney D Heinle
*Assistant Examiner* — John S Hunter, Jr.
(74) *Attorney, Agent, or Firm* — Seed Intellectual Property Law Group LLP

(57) ABSTRACT

A wind turbine rotor blade that has a rotor blade tip, a rotor blade root, a suction side, a pressure side, a rotor blade length, a profile depth and a pitch axis of rotation. The profile depth decreases along the rotor blade length from the rotor blade root to the rotor blade tip. The trailing edge has a trailing edge delimiting line, which replicates the contour of the trailing edge. The trailing edge has a plurality of serrations to improve flow behavior at the trailing edge. The (Continued)

serrations respectively have a serration tip, two serration edges and an angle bisector. The serration edges are provided non-parallel to a direction of incident flow that is perpendicular to the pitch axis of rotation. The serration edges are non-perpendicular to a tangent to the trailing edge delimiting line. The trailing edge delimiting line has a plurality of portions, at least one of the portions extending non-parallel to the pitch axis of rotation.

10 Claims, 9 Drawing Sheets

(52) U.S. Cl.
CPC ..... *F05B 2250/183* (2013.01); *F05B 2260/96* (2013.01); *Y02E 10/72* (2013.01)

(56) References Cited

U.S. PATENT DOCUMENTS

| | | | |
|---|---|---|---|
| 5,603,607 | A | 2/1997 | Kondo et al. |
| 7,059,833 | B2 | 6/2006 | Stiesdal et al. |
| 7,794,209 | B2 | 9/2010 | Wobben |
| 8,523,515 | B2 | 9/2013 | Drobietz et al. |
| 2003/0175121 | A1 | 9/2003 | Shibata et al. |
| 2009/0007458 | A1 | 1/2009 | Seiler |
| 2009/0074585 | A1 | 3/2009 | Koegler et al. |
| 2009/0324416 | A1 | 12/2009 | Bonnet |
| 2011/0142666 | A1 | 6/2011 | Drobietz et al. |
| 2013/0149162 | A1 | 6/2013 | Smith et al. |
| 2013/0280085 | A1* | 10/2013 | Koegler ............. F03D 1/0633 416/228 |
| 2014/0227101 | A1 | 8/2014 | Yao |
| 2015/0316029 | A1 | 11/2015 | Altmikus et al. |
| 2016/0177919 | A1 | 6/2016 | Van Garrel et al. |
| 2017/0152834 | A1 | 6/2017 | Kamruzzaman et al. |

FOREIGN PATENT DOCUMENTS

| | | |
|---|---|---|
| CN | 102465828 A | 5/2012 |
| DE | 102008037368 A1 | 4/2009 |
| DE | 102011055327 A1 | 5/2012 |
| DE | 102011050661 A1 | 11/2012 |
| EP | 0652367 A1 | 5/1995 |
| EP | 1314885 B1 | 8/2007 |
| EP | 2527642 A2 | 11/2012 |
| JP | 2000120524 A | 4/2000 |
| JP | 2003336572 A | 11/2003 |
| SU | 2694 A1 | 4/1927 |
| SU | 1740767 A1 | 6/1992 |
| UA | 54439 U | 11/2010 |
| WO | 2012156359 A1 | 11/2012 |
| WO | 2014086919 A1 | 6/2014 |
| WO | 2015016704 A1 | 5/2015 |
| WO | 2016009032 A1 | 1/2016 |

OTHER PUBLICATIONS

Corcos, "The structure of the turbulent pressure field in boundary-layer flows," *Fluid Mechanics* 18(Part 3):353-378, 1964, 28 pages.
Herrig, *Validation and Application of a Hot-Wire based Method for Trailing-Edge Noise Measurements on Airfoils*, Verlag Dr. Hut, Munich, Germany, 2012, 119 pages.
International Search Report dated Oct. 7, 2015 and Written Opinion for corresponding PCT/EP2015/066391, 10 pages.
English translation of Chinese Office Action dated Jan. 3, 2020, for Chinese Application No. 201580039154.4 corresponding to related U.S. Appl. No. 15/325,946, 12 pages.
Written Opinion dated May 26, 2020 for corresponding Brazilian Application No. BR112017000749 (with English translation, 6 pages).
Howe, *Acoustics of Fluid-Structure Interactions*, Cambridge University Press, Cambridge, United Kingdom, 1998, 572 pages.

\* cited by examiner

WIND-TURBINE ROTOR BLADE, ROTOR BLADE TRAILING EDGE, METHOD FOR PRODUCING A WIND-TURBINE ROTOR BLADE, AND WIND TURBINE

BACKGROUND

Technical Field

The invention relates to a trailing edge for a wind turbine rotor blade, to a rotor blade trailing edge and to a wind turbine. The present invention also relates to a method for producing a rotor blade.

Description of the Related Art

Wind turbines are generally known and are designed for example as in FIG. 1. The design of the rotor blade or rotor blades is an important aspect for the efficiency of the wind turbine. The rotor blades of a wind turbine usually have a suction side and a pressure side. The suction side and the pressure side converge at the trailing edge of the rotor blade. The difference in pressure between the suction side and the pressure side can cause turbulences to be produced, which may result in an emission of noise and a drop in power output at the trailing edge of the rotor blade.

In order to reduce the emission of noise and drop in power output, trailing edges with serrations have already been proposed. The effectiveness of the noise reduction depends here mainly on the geometry of the serrations. The provision of the optimum serration geometry at the trailing edge of a rotor blade of a wind turbine may however be an onerous task and there is the risk that it causes a disproportionate effort in relation to the effect.

In the priority-establishing German patent application, the German Patent and Trademark Office searched the following prior art: DE 10 2008 037 368 A1, EP 0 652 367 A1, WO 2014/086919 A1, US 2003/0 175 121 A1 and U.S. Pat. No. 5,088,665 A.

BRIEF SUMMARY

The present invention proposes a solution that further increases the effectiveness of a rotor blade of a wind turbine and reduces the noise emission.

Consequently, a wind turbine rotor blade has a rotor blade tip, a rotor blade root, a suction side, a pressure side, a rotor blade length, a profile depth and a pitch axis of rotation. The profile depth decreases along the rotor blade length from the rotor blade root to the rotor blade tip. The trailing edge has a trailing edge delimiting line, which replicates the contour of the trailing edge. The trailing edge has a plurality of serrations to improve flow behavior at the trailing edge. The serrations respectively have a serration tip, two serration edges and an angle bisector. The serration edges are provided non-parallel to a direction of incident flow that is perpendicular to the pitch axis of rotation. The serration edges are non-perpendicular to a tangent to the trailing edge delimiting line. The trailing edge delimiting line has a plurality of portions, at least one of the portions extending non-parallel to the pitch axis of rotation.

According to one aspect of the present invention, the length of the two trailing edges of a serration is unequal and/or the angle bisector of a serration is non-perpendicular to the pitch axis of rotation and/or an angle of an angle bisector to a tangent to the trailing edge delimiting line has an angle of between 70 and 110 degrees, in particular 90 degrees.

The rotor blade may have a trailing edge with a trailing edge delimiting line over its entire blade length, that is to say from the rotor blade root to the rotor blade tip. The trailing edge delimiting line in this case replicates the contour of the trailing edge, that is to say the line in which the suction side and the pressure side of the rotor blade converge. In particular, such a trailing edge delimiting line is a curved line. The multiple serrations are arranged next to one another at the trailing edge delimiting line. The serrations are in this case provided or aligned in dependence on the trailing edge delimiting line. That is to say that the trailing edge delimiting line, and consequently the contour or the geometry of the trailing edge, is taken into account in the design of the serrations at the trailing edge. Accordingly, curvatures and the like are also taken into account in the alignment of the serrations at the trailing edge. This has the advantage that the serrations are optimally adapted to the trailing edge delimitation, and consequently turbulences occurring can be reduced. As a result, the noise emission and a drop in power output are likewise reduced.

The profiles or the geometries and thus also the trailing edge delimiting line of rotor blades of various types of wind turbine are differently designed. The design is at the same time dependent on the different sites, at which different wind conditions such as strong wind or light wind may prevail. In this case, the definition of the serrations is dependent on the geometrical and operating parameters of the rotor blade or the wind turbine, and consequently on the trailing edge delimiting line. The arrangement of the serrations dependent on the trailing edge delimiting line allows the serrations to be adapted individually to the respective profile of the rotor blade. The noise emission can consequently be optimally reduced and the power output of the wind turbine can be increased.

Preferably, the serrations are arranged normal to the trailing edge delimiting line. In this case, the individual serrations respectively have a serration height. The maximum serration height is located here on a normal to the trailing edge delimiting line. Such serrations can intercept turbulences of various magnitudes occurring at the trailing edge, and thereby reduce the noise emission. In the case of a curved trailing edge delimiting line, the serrations are correspondingly aligned unequally. They consequently point at least partially in different directions.

In a particularly preferred embodiment, each serration has at least two serration edges and the trailing edge has a serration trailing edge delimiting angle, which is defined by a serration edge and the direction of incident flow, provided normal to the trailing edge delimiting line. In this case, the serration trailing edge delimiting angle is less than 90°, particular less than 45°. The values mentioned achieve an optimum flow behavior at the trailing edge. It is a theoretical assumption that the serration trailing edge delimiting angle is normal to the trailing edge delimiting line. In reality, such a serration trailing edge delimiting angle may well also be greater as a result of a change in the incident flow, which leads to a flow behavior at the trailing edge that is not optimum. However, the alignment of the serrations with a serration trailing edge delimiting angle of less than 90°, in particular less than 45°, makes it possible to compensate for such changes in the direction of incident flow, so that they scarcely have any influence on the development of noise and/or the power output of the wind turbine.

In a preferred embodiment, the serration trailing edge delimiting angle is variable along a rotor blade length, the rotor blade length being defined by the length of the rotor blade from the rotor blade root to the rotor blade tip. That is to say that the angle between a serration edge and the direction of incident flow that is provided normal to the trailing edge delimiting line is not restricted to just one value. Rather, different values for the serration trailing edge delimiting angle may be obtained for example in the region of the rotor blade root than in the region of the rotor blade tip. In this way, an optimum flow behavior can be achieved.

In a preferred embodiment, the rotor blade has a pitch axis and the serrations are arranged normal to the pitch axis. The pitch axis of the rotor blade is to be understood here as meaning the axis about which the angle of attack, that is to say the pitch, of the rotor blades is adjusted. The angle of attack or pitch angle is adjusted in order to regulate the power output of the wind turbine and, with changing wind speeds, to achieve in each case an optimum efficiency of the wind turbine. There are theories that the incident flow acts normal to this pitch axis or axis of attack. An alignment of the serrations in a way corresponding to the pitch axis brings about a reduction in the turbulences, and consequently a reduction in noise.

Preferably, the trailing edge has a serration pitch angle which is defined by a tangent at a predetermined position on the trailing edge delimiting line. The trailing edge delimiting line has various points for each position along the span of the rotor blade. The placing of a tangent at the respective point produces many different tangents, and consequently different serration pitch angles, along the span of the rotor blade. The angle between the pitch axis and the respective tangent defines the serration pitch angle. This is consequently likewise calculated in dependence on the trailing edge delimiting line. The adaptation to the trailing edge delimiting line allows turbulences occurring to be reduced, whereby the noise emission can also be reduced.

Preferably, the multiple serrations and/or serration edges along a or the rotor blade length are arranged asymmetrically at the trailing edge. The fact that the trailing edge delimiting line may have a curved form and the serrations are aligned dependently on the trailing edge delimiting line means that the serrations are aligned differently at different positions along the rotor blade length, and consequently not symmetrically. In particular, the two serration edges of a serration may in this case have different angles in relation to the incident flow. This makes it possible to compensate for different turbulences.

In a particularly preferred embodiment, the trailing edge delimiting line is at least partially curved over the span of the rotor blade, that is to say is not straight. Since aerodynamic profiles have a very complex geometry to achieve the optimum power output, it is sometimes necessary that the trailing edge delimiting line is not straight at some points along the rotor blade length, therefore extends in a curved manner. The fact that the serrations are adapted to the trailing edge delimiting line or are calculated as dependent on it means that such a curvature is also taken into account. The rotor blade can in this way be designed with respect to its profile and the optimum arrangement of the serrations at the trailing edge or the geometry of the serrations.

Preferably, the rotor blade has a rotor blade root and a rotor blade tip, the serration trailing edge delimiting angle increasing from the rotor blade root to the rotor blade tip in the case of the serration edges that point towards the rotor blade root and/or decreasing from the rotor blade root to the rotor blade tip in the case of the serrations that point away from the rotor blade root. That is to say that the serration trailing edge delimiting angle on the one hand decreases on the side of the serrations that point in the direction of the rotor blade tip and on the other hand increases on the side of the serrations that are facing the rotor blade root. On account of the different incident flow conditions, such as the Reynolds number, the Mach number, the angle of attack etc., that occur at the rotor blade root and the rotor blade tip, turbulences of various magnitudes are produced near the trailing edge. Large serration trailing edge delimiting angles are effective for example for great turbulences and small serration trailing edge delimiting angles are effective for small turbulences. The arrangement according to the invention consequently allows small and great turbulences to be covered. Moreover, in the case of moderate turbulences, such an arrangement has at least averagely good effectiveness.

Moreover, to achieve the object, a rotor blade for a wind turbine is proposed, comprising at least a trailing edge according to one of the embodiments above. Such a rotor blade is in this case in particular a rotor blade of an upwind rotor with active blade adjustment. The rotor blade can in this case be used for wind turbines of all power output classes, particularly in power output classes in a megawatt range. The relationships, explanations and advantages according to at least one embodiment of the trailing edge described are consequently obtained.

Furthermore, a wind turbine with at least one rotor blade according to the invention, preferably with three rotor blades according to the invention, is proposed.

Furthermore, a method for calculating a serration geometry on a trailing edge of a rotor blade of an aerodynamic rotor of a wind turbine is proposed. In this case, the trailing edge has a trailing edge delimiting line, which replicates the contour of the trailing edge, and the serration geometry is calculated in dependence on the trailing edge delimiting line. Each serration has in this case a serration height, serration width and at least two serration edges. The serration edges in this case extend from the serration width to the serration tip. They may touch at the serration tip or alternatively the serration tip may also be round or be configured with a further edge. The serration geometry is defined by the present method in particular by way of the arrangement of the serration edges in relation to the trailing edge delimiting line.

The relationships, explanations and advantages according to at least one embodiment of the trailing edge described are consequently obtained.

Preferably, in the case of the method according to the invention
- the local incident flow is assumed to be normal to the trailing edge delimitation and/or
- a serration trailing edge delimiting angle that is defined by the incident flow and a serration edge is calculated, the serration trailing edge delimiting angle being less than 90°, preferably less than 60°, in particular less than 45°.

In a preferred embodiment, in the case of a method according to the invention
- the direction of incident flow is assumed to be normal to the pitch axis of the rotor blade and/or
- multiple serrations are aligned normal to the pitch axis, a serration pitch angle which, between the pitch axis and a serration edge, corresponds to the angle of a tangent at a position of the trailing edge being calculated.

The trailing edge delimiting line has various points for each position along the span of the rotor blade. The placing of a tangent at the respective point produces many different tangents, and consequently different serration pitch angles, along the rotor blade length. The angle between the pitch axis and the respective tangent defines the serration pitch angle. This is consequently likewise calculated in dependence on the trailing edge delimiting line. The adaptation to the trailing edge delimiting line allows turbulences occurring to be reduced, whereby the noise emission can also be reduced.

In a preferred embodiment, the method for calculating the serration geometry for a trailing edge according to at least one of the embodiments described above is used.

The calculations are in this case based on the following considerations.

The Strouhal number is very much smaller than 1. The Strouhal number is in this case a dimensionless characteristic of aerodynamics with which the separation frequency of turbulences when there is an unsteady flow can be described. One of the factors influencing the Strouhal number is the serration height. The following relationship is obtained here for the serration height:

$$H\left(\frac{r}{R}\right) = 2h = c2 \cdot \Lambda_{p3}\left(\frac{r}{R}\right)$$

Where H (r/R) is the serration height at a point r along the rotor blade R. Where r is the point along the blade where the serration height is to be determined. R is the length of the rotor blade, where C2 has a value of 2 to 15 and a constant. The serration height is consequently calculated from the coherence length scale $\Lambda_{p3}$ of the turbulent pressure fluctuation by using a constant factor c2. The factor c2 may be determined empirically, or from test measurements or from values obtained from experience.

The ratio of the serration height to the serration width becomes as $$\frac{H}{\lambda} > 0.5,$$

where $\lambda = H/c3$ and $c3 = 0.5$ to 6 is an empirical constant.

The angle between the direction of local incident flow and the serration edge, that is to say the serration trailing edge delimiting angle, is $\Phi_i < 90°$, where it is assumed that the incident flow is normal to the pitch axis of the rotor blade, in the present case therefore $\Phi_i = \Phi \pm \theta_i$. Where $\theta_i$ is the serration pitch angle. In this case, the serration pitch angle $\theta_i$ varies along the rotor blade length, dependent on the trailing edge delimitation.

BRIEF DESCRIPTION OF THE SEVERAL VIEWS OF THE DRAWINGS

The invention is explained in more detail below by way of example on the basis of exemplary embodiments with reference to the accompanying figures.

It should be noted that the same designations may possibly denote elements that are similar but not identical and may also be of different embodiments.

The explanation of the invention on the basis of examples with reference to the figures is substantially schematic, and, for the sake of better illustration, the elements that are explained in the respective figure may be exaggerated in it and other elements simplified. Thus, for example, FIG. 1 schematically illustrates a wind turbine as such, and so the intended serrated trailing edge on the rotor blade cannot be clearly seen.

DETAILED DESCRIPTION

Figure 1:
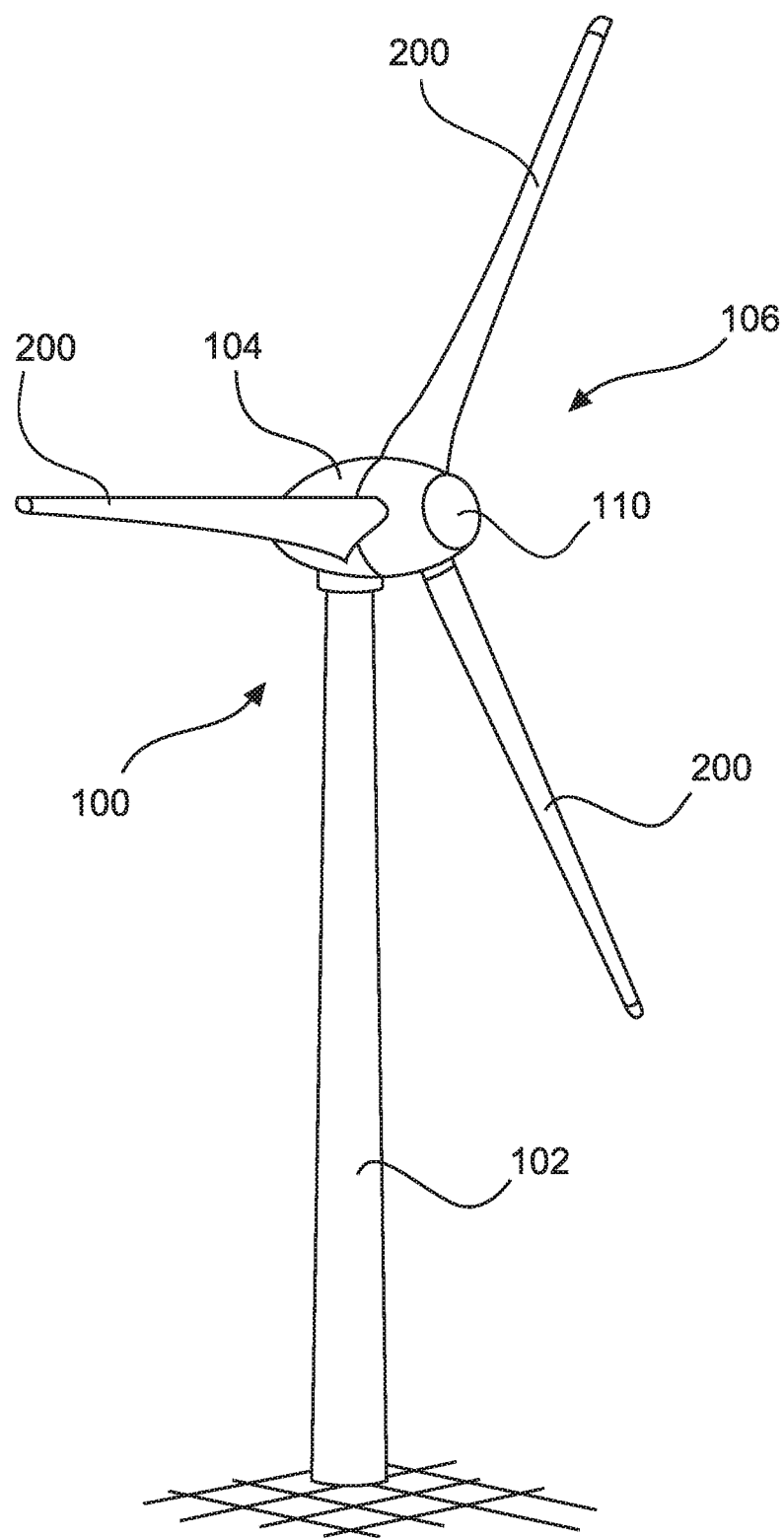
FIG. 1 schematically shows a wind turbine in a perspective view.

FIG. 1 shows a wind turbine 100 with a tower 102 and a nacelle 104. Arranged on the nacelle 104 is a rotor 106 with three rotor blades 200 and a spinner 110. During operation, the rotor 106 is set in a rotational movement by the wind and thereby drives a generator in the nacelle 104. The pitch of the three rotor blades can be set for example in each case by a pitch drive.

Figure 2:
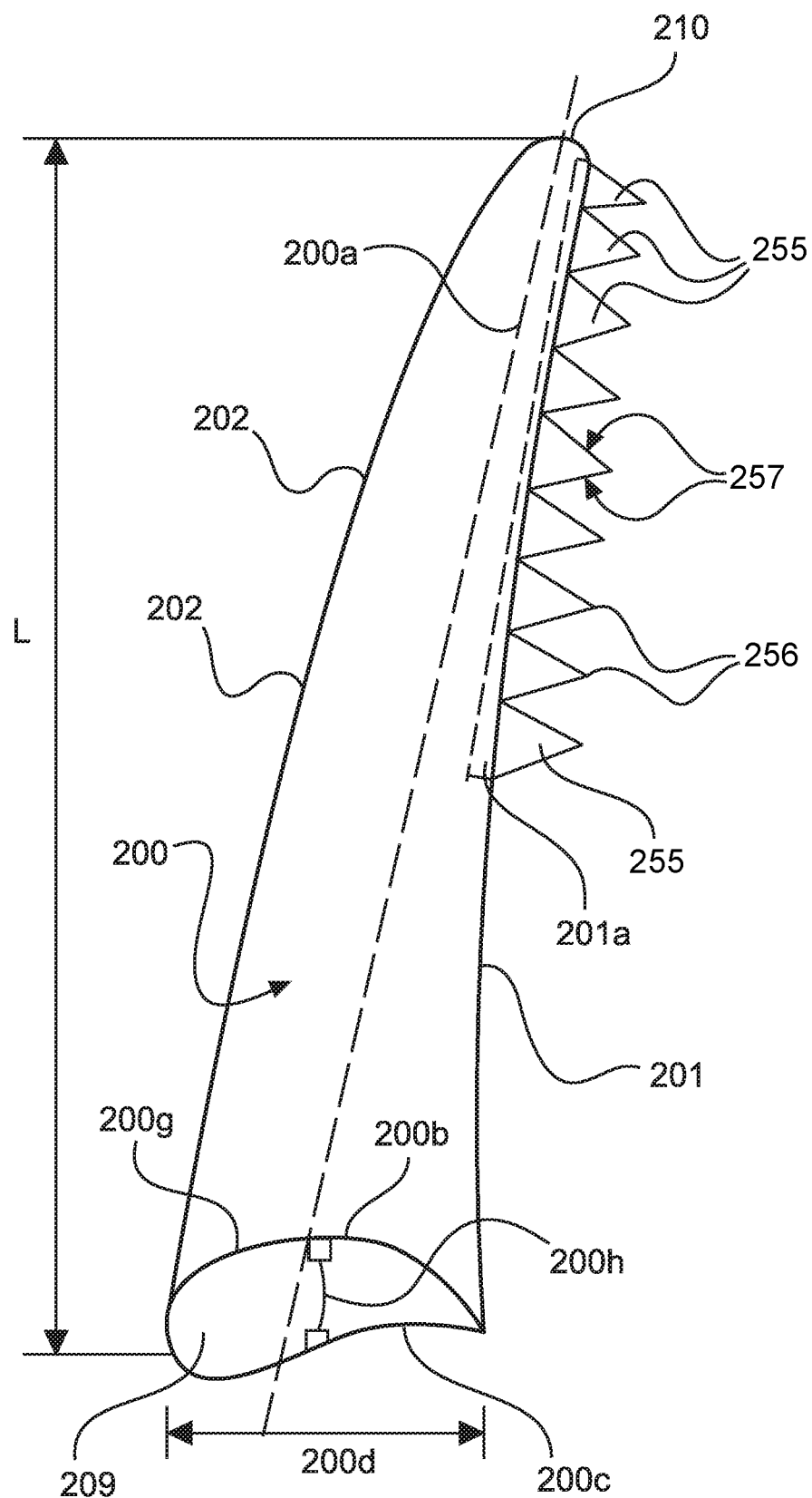
FIG. 2 schematically shows a rotor blade with a trailing edge with a serrated delimitation comprising multiple serrations according to a first exemplary embodiment.

FIG. 2 schematically shows a wind turbine rotor blade 200 according to a first exemplary embodiment with a rotor blade trailing edge 201, which for simplicity is also referred to as the trailing edge. The rotor blade 200 has a rotor blade root 209 and a rotor blade tip 210. The length between the rotor blade tip 210 and the rotor blade root 209 is referred to as the rotor blade length L. The rotor blade 200 has a pitch axis of rotation 200a. The pitch axis of rotation 200a is the axis of rotation of the rotor blade when the pitch of the rotor blade is adjusted. The rotor blade 200 has a suction side 200b, a pressure side 200c and a leading edge 202. The rotor blade 200 has a profile depth 200d, which decreases along the length L of the rotor blade (towards the rotor blade tip).

The rotor blade 200 has an outer shell 200g, inter alia with a fiber composite material, such as for example GRP (glass fiber reinforced plastic) or CRP (carbon fiber reinforced plastic). In addition, webs 200h may be provided between the suction side and the pressure side.

The trailing edge 201 is not straight (along the length L of the rotor blade), but has a plurality of portions that can be aligned differently in relation to the pitch axis of rotation 200a.

Provided on the rotor blade 200 is a trailing edge 201, which has a serrated delimitation with multiple serrations 255, which by way of example are arranged next to one another along the rotor blade 200 on a portion of the rotor blade 200. Each serration 255 respectively has a serration tip 256 and also two serration edges 257, which touch at the serration tip 256. One side of a serration edge 257 in each case likewise touches a neighboring serration edge 257 and on the opposite side, that is to say in the region of the serration tip 256, again touches the second serration edge 257 belonging to the respective serration 205, etc. It should be noted that the detail shown of the rotor blade 200 is only an exemplary embodiment. The serrations 255 may for example also be provided in one or more further portions or over the entire blade length L of the rotor blade 200. Furthermore, it is possible that the serrations 255 also extend further over the trailing edge 201 of the rotor blade 200.

A trailing edge with a plurality of serrations 255 may be designed as a separate part 201a. In this way a trailing edge portion 201a with a plurality of serrations 255 can also be retrofitted on an existing rotor blade. Furthermore, this trailing edge portion 201a may be produced separately, in order to be fastened to the trailing edge during the production of the rotor blade. For this purpose, it may be necessary that a portion or segment has to be removed or sawn out or cut out from the trailing edge of the rotor blade already produced.

Figure 3:
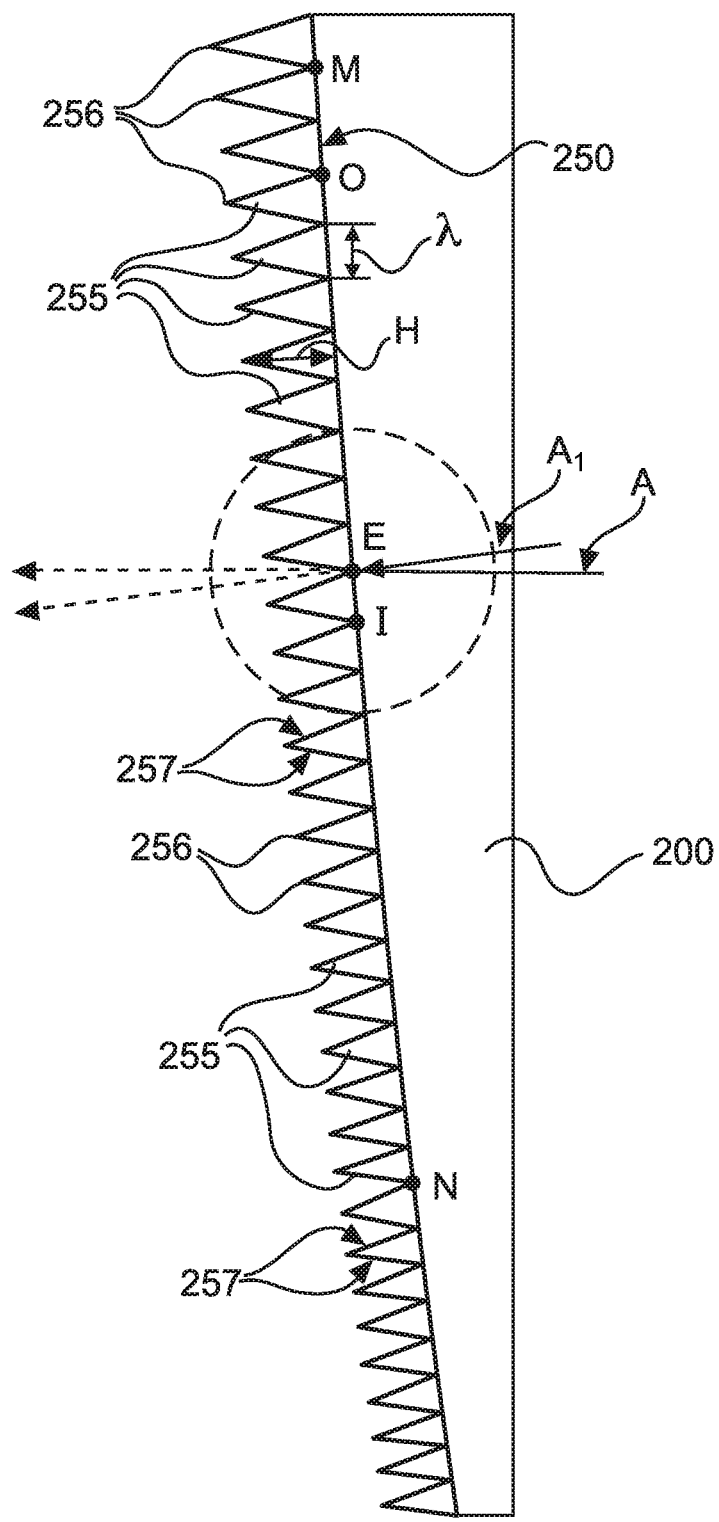
FIG. 3 schematically shows a detail of a rotor blade with a serration geometry of the trailing edge along the span.

FIG. 3 shows a detail 252 of a rotor blade 200 as depicted for example in FIG. 2, with a trailing edge delimiting line, which for simplicity is also referred to in the present case as the trailing edge delimitation 250. A curve along the points MOEN characterizes the trailing edge delimitation 250 of the rotor blade 200 as a function of various radial positions, that is to say various positions along the rotor blade length or the span of the rotor blade 200.

In FIG. 3, the direction of the local direction of incident flow $A_1$ and A can also be seen. The local direction of incident flow $A_1$ and A differs by two different assumptions. In the case of the direction of local incident flow $A_1$, it is assumed that it extends normal to the trailing edge. The direction of local incident flow A is provided normal to the pitch axis 200a of the rotor blade 200. Arranged along the trailing edge delimitation 250 are multiple serrations 255, which respectively have a serration tip 256 and also respectively have two serration edges 257. Moreover, the serrations 255 have a serration height H and also a serration width $\lambda$.

Figure 4:
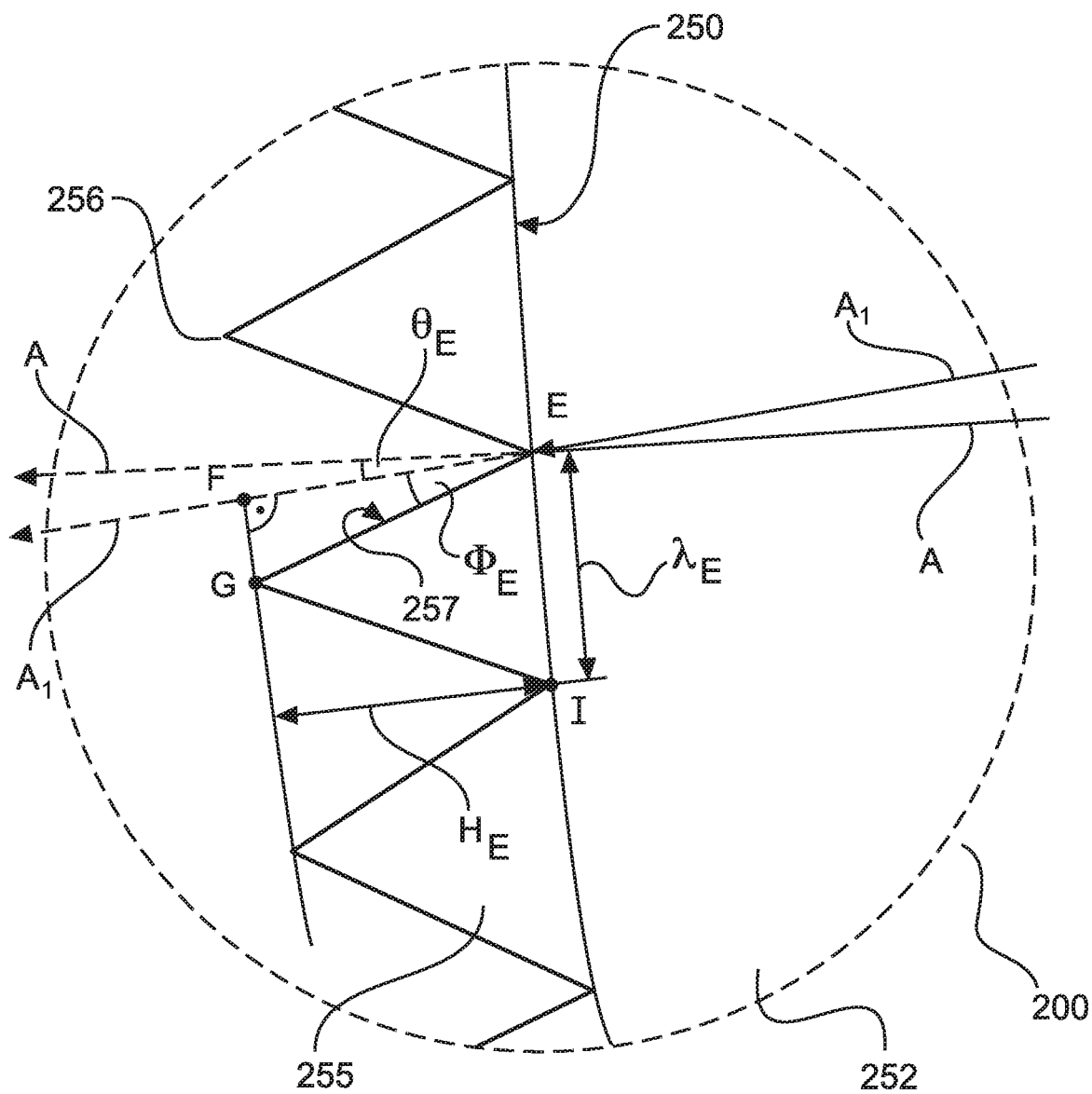
FIG. 4 shows an enlarged detail of the rotor blade from FIG. 3.

FIG. 4 shows an enlarged detail 252 of the rotor blade 200 from FIG. 3 at the points E and I on the trailing edge delimiting line 250. Moreover, the serration height $\lambda_E$ and the serration width $\lambda_E$ at the point E are also depicted. The point G is depicted in the serration tip 256. The point F is the point of intersection of the direction of local incident flow $A_1$ and the extension line of the point G, which are arranged at right angles to one another.

At the point E, the serration edge 257 forms together with the direction of local incident flow $A_1$ a serration trailing edge delimiting angle $\Phi_E$. For a given definition of the serration height $H_E$ and serration width $\lambda_E$ at the point E, the angle $\Phi_E$ can be calculated. It thus follows from the triangle EFG in FIG. 4 that $$\tan(\Phi_E) = \frac{\lambda_E/2}{H_E} = \frac{\lambda_E}{2H_E}$$

and with $$\frac{H_E}{\lambda_E} = 2$$

it follows that $$\tan(\Phi_E) = \frac{\lambda_E}{2H_E} = \frac{1}{4}.$$

From this it follows that $\Phi_E = 14,03°$.

So if $H_E/\lambda_E=2$ remains constant along the entire span of the rotor blade, then $\Phi_E=14,03$ likewise remains constant. It has been found that the maximum noise reduction can be achieved when the angle between the main direction of incident flow and the serration edge (or line EG in FIG. 4) is less than 90°, in particular less than 45°. Consequently, the angle $\Phi_E$ calculated for FIG. 4 lies in the stated range. It is likewise possible to vary the angle $\Phi$, for example by variation of the ratio of H/λ or the direction of incident flow. With the variation of H/λ=[0.5,1,2,4,6,8] and the assumption that the direction of incident flow is constant, the following values would be obtained for $\Phi$: 45; 26.56; 14.03; 7.12; 4.76; 3.57 degrees. This presupposes that the direction of incident flow remains unchanged. However, the local direction of flow varies during the operation of the wind turbine.

Therefore, a relationship is established between the line $A_1E$ and AE. This allows a distribution of non-symmetrical serration geometries in which the angle $\Phi$ varies along the span of the rotor blade.

Figure 5:
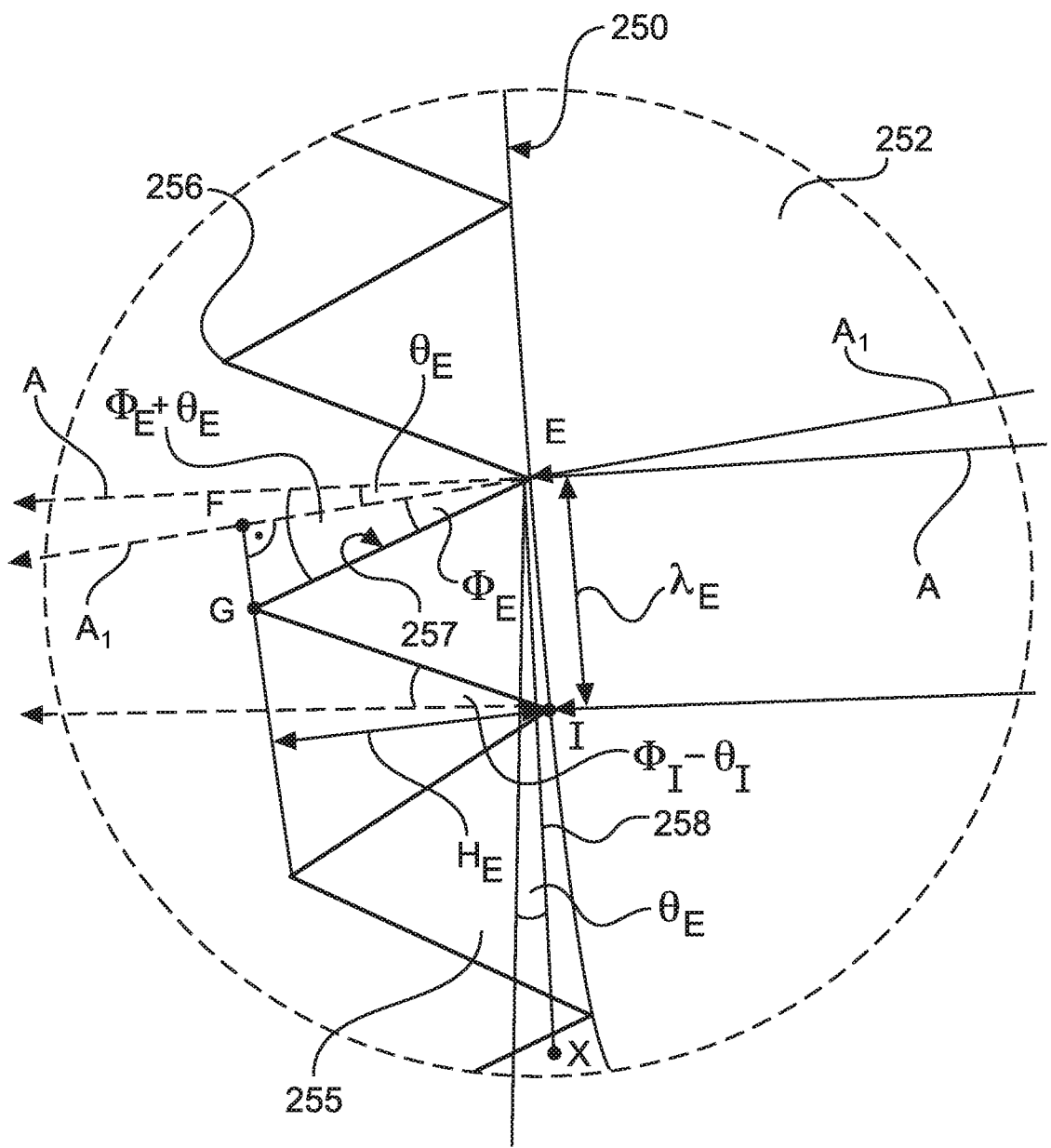
FIG. 5 shows a further enlarged detail of the rotor blade from FIG. 3.

FIG. 5 shows a further detail 252 of the rotor blade 200 from FIG. 3, with the trailing edge delimitation 250. In addition to FIG. 4, FIG. 5 shows a tangent 258 passing through the point E. The serrations 252 are aligned normal (to the tangent 258 of the trailing edge) to the trailing edge. The normal to the trailing edge produces a serration pitch angle $\theta_E$ with the direction of incident flow normal to the pitch axis 200a. The serration pitch angle $\theta_E$ is determined by way of the tangent at the point E (line XE 258). If the tangent 258 at each position of the trailing edge 250 is different, the serration pitch angle $\theta_E$ varies from the beginning of the rotor blade 200 to the end of the rotor blade tip or from the rotor blade root to the rotor blade tip, depending on the respective trailing edge delimitation 250. It can be seen from FIG. 5, in particular at the positions E and I, that the angle between the direction of local incident flow and the serration edges 257 is calculated from $\Phi_E+\theta_E$ and $\Phi_I-\theta_I$, respectively. The serration edges 257 are not symmetrical over the line for the direction of incident flow AE, because the angle $\Phi+\theta_E$ is not identical to the angle $\Phi-\theta_I$. This indicates that the local angle of incident flow between the direction of incident flow and the serration edge 257 at the point E and at the point I is not identical. This only applies if the direction of local incident flow is normal to the pitch axis, as in FIG. 4.

However, the exact direction of local incident flow is always unknown. It can at best be approximated by an assumption. It is therefore likewise possible to change the serration geometry in such a way that an optimum $\Phi$ and H/λ is achieved.

Figure 6:
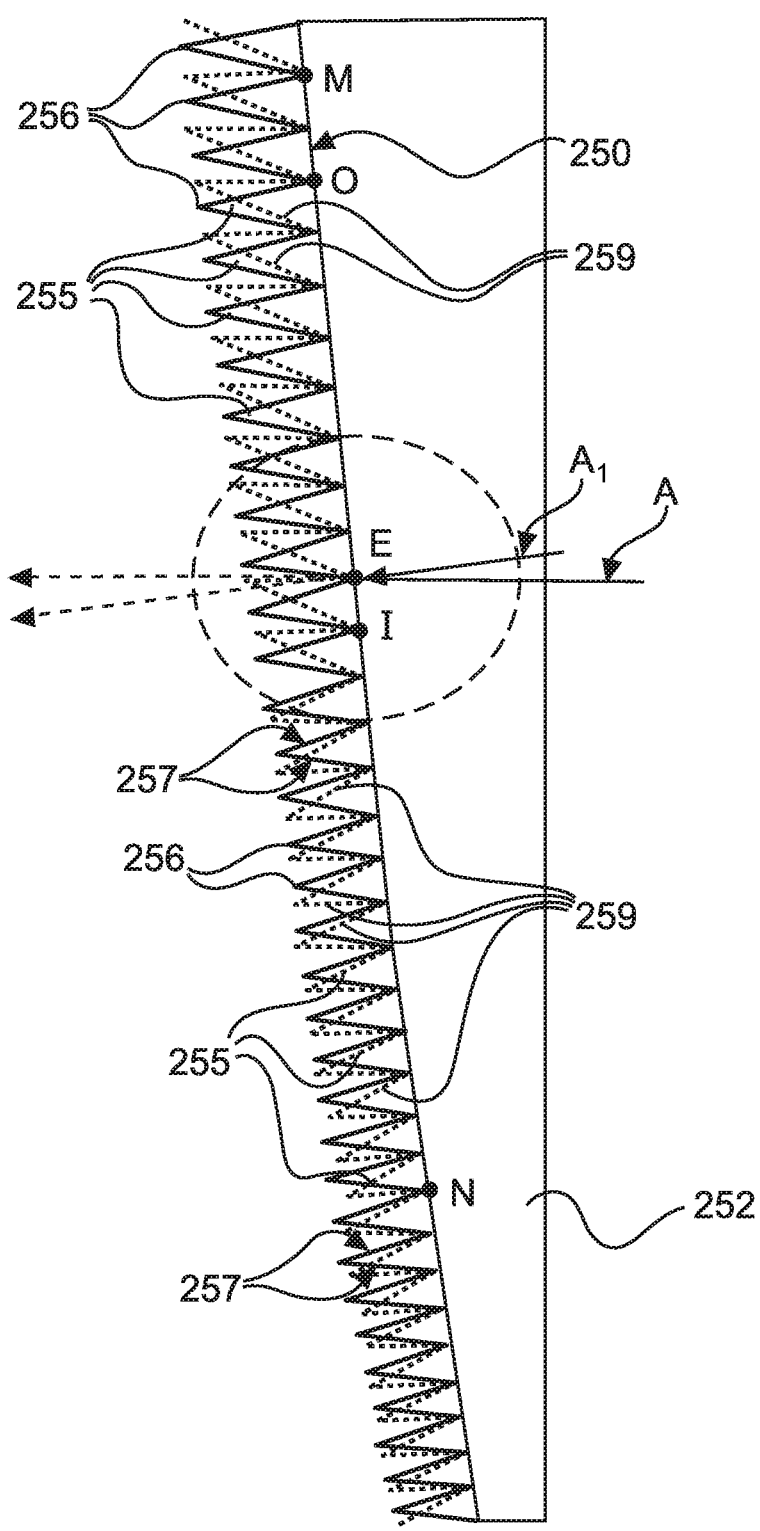
FIG. 6 schematically shows a detail of a rotor blade with two different serration geometries at the trailing edge.

FIG. 6 schematically shows in this respect a detail 252 of a rotor blade 200 with two different serration geometries. The first geometry, to be specific the serrations 255, are aligned normal to the trailing edge 250 of the rotor blade 200. The second geometry, to be specific the serrations 259, are aligned normal to the pitch axis 200a of the rotor blade 200. The serrations 259 are in this case represented by a dash-dotted line. For this case, the angle between the direction of incident flow and the serration edge at point E and I is $\theta_E$ and $\theta_I$, respectively.

Figure 7:
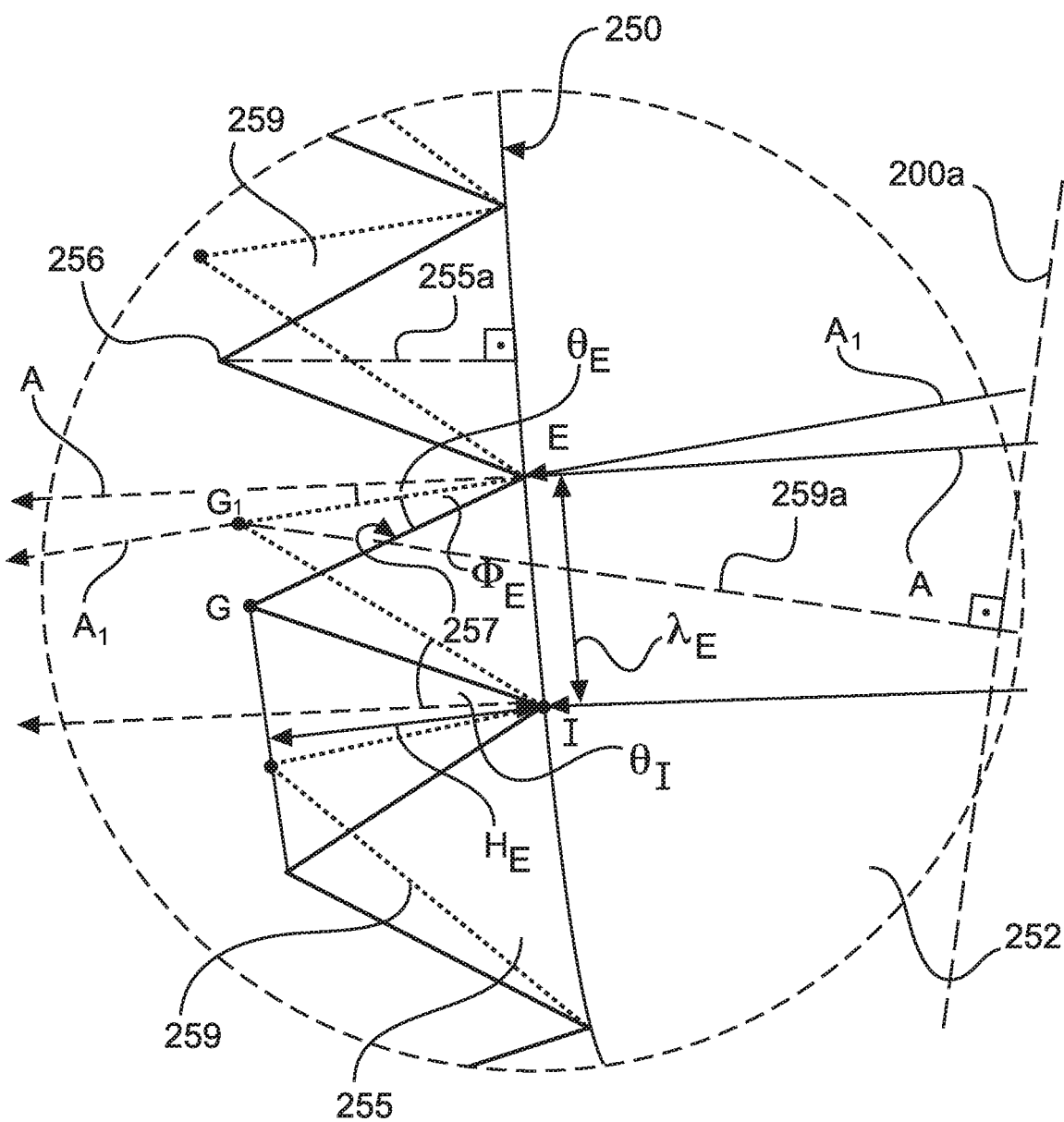
FIG. 7 shows an enlarged detail of the rotor blade from FIG. 6.

FIG. 7 shows an enlarged detail 252 of the rotor blade 200. The serration geometry is carried out by way of a coordinate transformation of the serration data from the serrations that are arranged normal to the trailing edge.

In FIG. 7, consequently, on the one hand the serrations 255 with the serration tips 256 and the serration edges 257 are shown, an angle bisector 255a-255e of these serrations being perpendicular to the trailing edge delimiting line 250. An angle bisector 259a of the serrations 259 is perpendicular to the pitch axis of rotation or the pitch axis 200a. The point $G_1$ is the tip of serration 259.

Noise field measurements were carried out for three rotor blade configurations: 1) for a rotor blade without serrations, 2) for a rotor blade with serrations that are aligned normal to the rotor blade trailing edge, and 3) for a rotor blade with serrations that are aligned normal to the pitch axis. It has been found from the data that the respective rotor blades with the serrations on the rotor blade were less noisy than the rotor blades without serrations on the rotor blade. Moreover, the alignment of the serrations dependent on the trailing edge delimitation of the rotor blade is particularly preferred. This arrangement achieves particularly good noise reductions, for example with an increase, in particular in radial position i=1,3,5 . . . N−1, and a decrease, in particular in radial position i=2,4,6, . . . N, of the angle $\Phi_i$ along the span. This therefore has the result that, on account of different local incident flow conditions such as different Reynold numbers, Mach numbers and angles of attack at the various positions of the rotor blade, turbulences of different magnitudes are produced near the trailing edge, i.e., for larger turbulences, serrations with a $\Phi_i$, such as for example at point E i=17, are more effective than smaller angles. For smaller turbulences, serrations with a small $\Phi_i$, for example at point I, i=18, are more effective than serrations with a large angle. On the other hand, both serration geometries are effective for moderate turbulences. For optimum results, the following conditions should also be satisfied:

I. The Stroughal number $\omega h/U_c \gg 1$, where $$H\left(\frac{r}{R}\right) = 2h = c2 \cdot \Lambda_{p3}\left(\frac{r}{R}\right),$$

and c2=2 to 15 is a constant,

II. Length to width ratio where $$\frac{H}{\lambda} > 0.5,$$

$\lambda = H/c3$, and c3=0.5 to 6 is an empirical constant, where H (r/R) is the serration height at a point r along the rotor blade R. Where r is the point along the blade where the serration height is to be determined. R is the length of the rotor blade, III. The serration trailing edge delimiting angle between the direction of local incident flow and the serration edge $\Phi_i < 90°$, where it is assumed that the incident flow is normal to the pitch axis of the rotor blade, in the present case therefore $\Phi_i = \Phi \pm \theta_i$ according to FIG. 5. In this case, the serration pitch angle $\theta_i$ varies along the span, dependent on the trailing edge delimitation.

Figure 8:
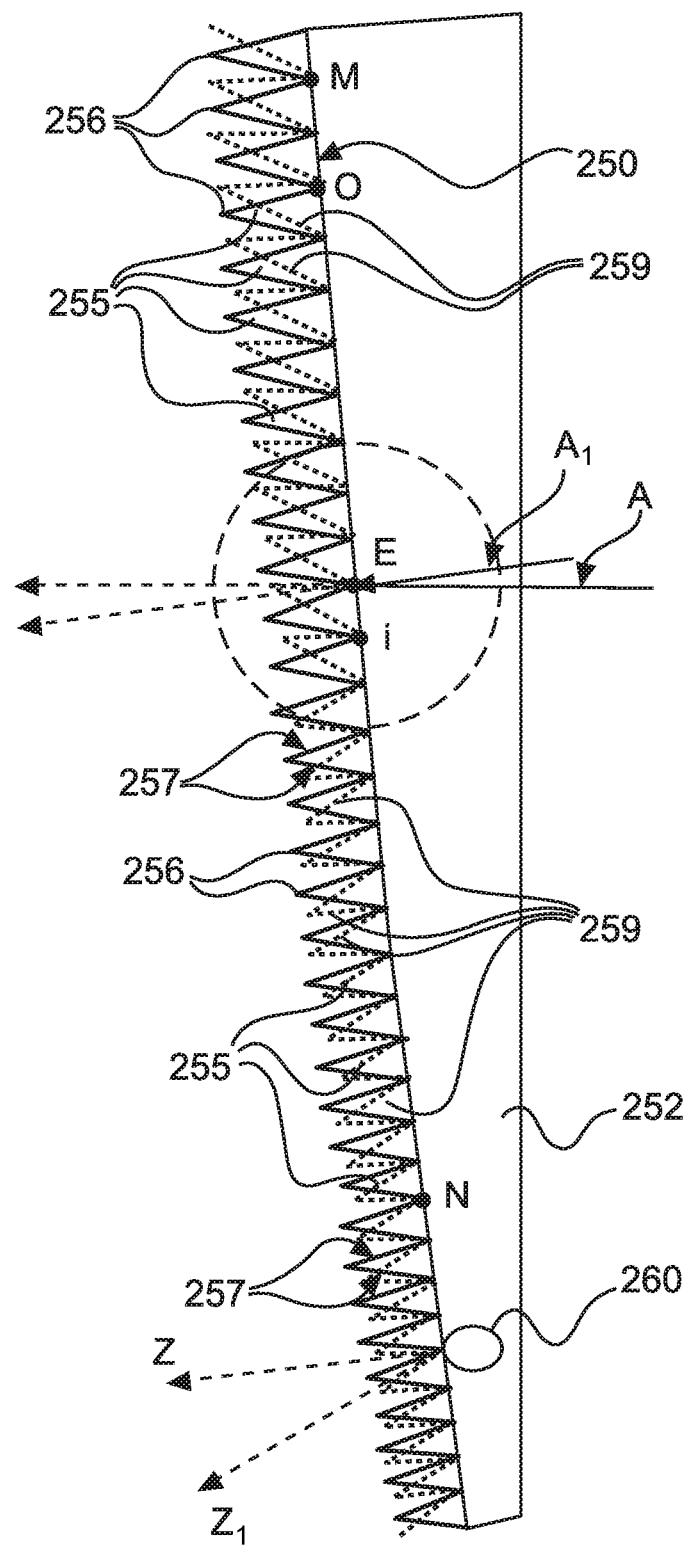
FIG. 8 schematically shows a detail of a rotor blade according to the first exemplary embodiment.

FIG. 8 shows in addition to FIG. 6 a turbulence 260 that is approaching the trailing edge. For simplicity, the turbulence 260 is in this case represented as an ellipse. According to the theoretical assumptions, the turbulence 260 would continue to move in direction Z. In reality, the turbulence 260 would however continue to move in direction $Z_1$. Such a turbulence is in this case an unexpected, unsteady aerodynamic phenomenon that can definitely occur in reality. In such situations, the condition $\Phi_i < 90°$ is disturbed. The serrations 255 and 259 represented can however also compensate for such turbulences 260, and thereby also reduce the development of noise at the rotor blade 200 in the case of such a turbulence 260.

Figure 9:
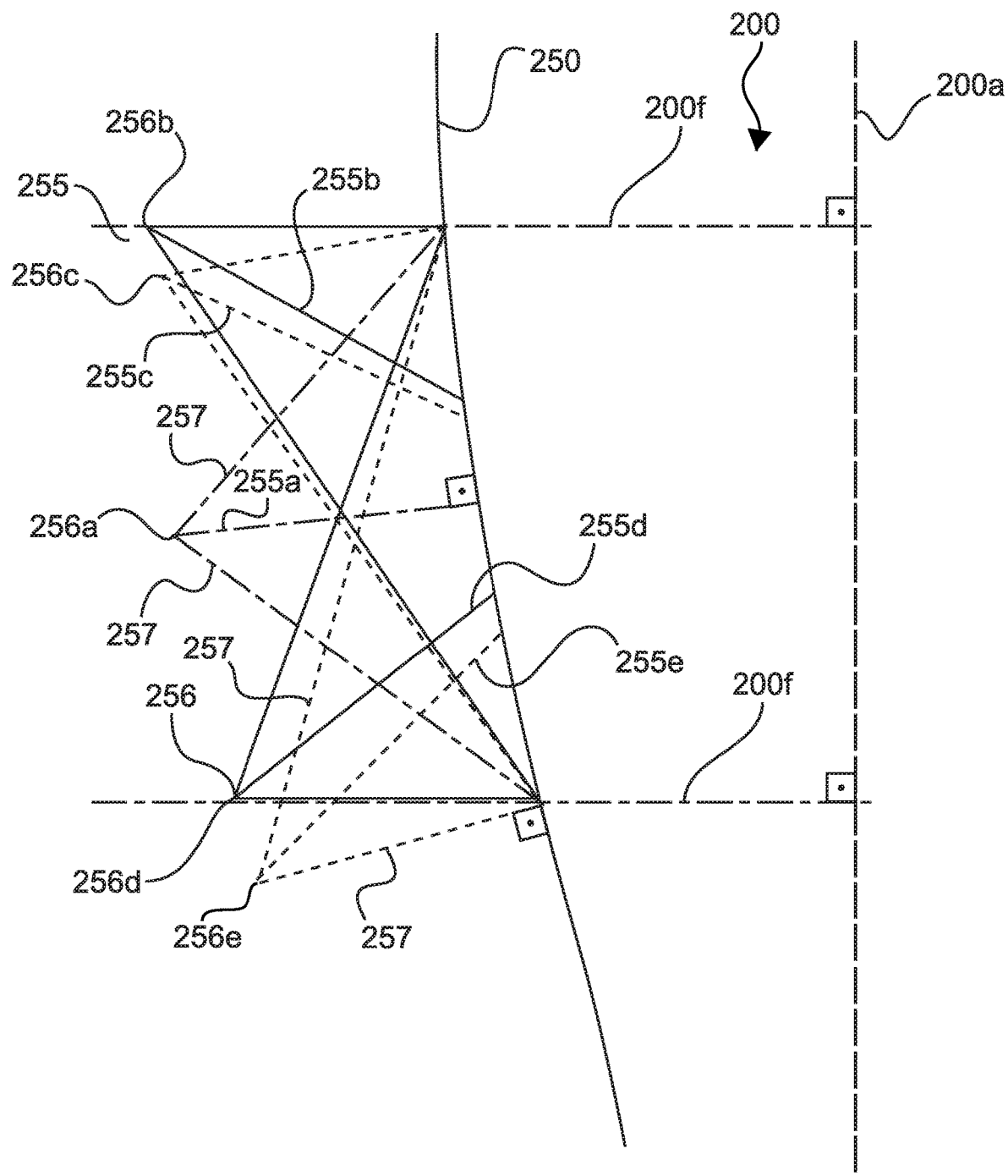
FIG. 9 shows a schematic representation of a detail of a rotor blade according to a second exemplary embodiment of the invention.

FIG. 9 shows a schematic representation of a detail of a rotor blade according to a second exemplary embodiment of the invention. The rotor blade 200 has a pitch axis of rotation 200a and a trailing edge delimitation 250. Furthermore, the rotor blade has a plurality of serrations 255 at the trailing edge delimitation 250. The serrations 255 respectively have a serration tip 256 and also two serration edges 257 and an angle bisector 255a.

The trailing edge of a rotor blade according to the second exemplary embodiment may have a trailing edge portion (as shown in FIG. 2) that is produced independently of the rotor blade and is fastened to the trailing edge during the production process of the rotor blade. Such a trailing edge portion is consequently a separate part and can be used for the purpose of retrofitting the already produced rotor blade with a serration geometry at the trailing edge.

Five different possible serration geometries are shown in FIG. 9. This serration 255 respectively have a serration tip 256a, 256b, 256c, 256d, and 256e. Each of the serrations 255 also has an angle bisector 255a, 255b, 255c, 255d, and 255e. Also shown is a direction of incident flow 200f which is perpendicular to the pitch axis of rotation 200a. The rotor blade 200 according to the second exemplary embodiment may be based on a rotor blade according to the first exemplary embodiment and concerns a rotor blade that has a serration geometry, the angle bisectors 255a-255e being provided for example perpendicularly to a tangent to the trailing edge 250. The serration geometry according to the second exemplary embodiment concerns a range of geometries, the extreme cases being represented by the serrations 255 with the serration tips 256b and 256d, which however are not included in the range of geometries according to the invention. In the case of these two extreme cases, one of the serration edge 257 is aligned parallel to the direction of incident flow 200f.

The angle bisector 255a may optionally be substantially perpendicular to the trailing edge delimitation 250; in particular, the angle between the angle bisector of the serrations and the trailing edge delimitation may be between 70 and 110 degrees.

The alignment of the flanks of the serrations is an important parameter. The fact that the trailing edge delimitation of the rotor blade is not straight also has effects on the geometry of the serrations.

The provision of the serrations at the rotor blade trailing edge may lead to the emergent flow vector being aligned differently than the incident flow vector. This may be relevant in particular in the region of the rotor blade tip, because the trailing edge delimitation changes more along the length of the rotor blade in the region of the outer portion or diameter of the rotor blade. On account of centrifugal effects, it may be that the incident flow is no longer two-dimensional but three-dimensional.

The serrations may be designed in such a way that the serration tips are provided off-center.

The serrations may be designed at least in certain portions along the length of the rotor blade in such a way that the serrations are not symmetrical or that the two serration edges 257 do not have the same length.

According to one aspect of the present invention, the angle bisector that extends through the serration tip is perpendicular to a tangent to the trailing edge. Alternatively or in addition to this, the length of the serration edges 257 of a serration may be different, so that the serration is not symmetrically designed.

The invention relates to a wind turbine rotor blade which has at its trailing edge a trailing edge portion that has a plurality of serrations, respectively with a serration tip, two serration edges and an angle bisector. The trailing edge portion may be produced separately or be produced together with the rest of the rotor blade. The angle bisectors of some of the serrations of the plurality of serrations are arranged at an angle of between 70 and 110 degrees with respect to a tangent to a trailing edge delimiting line. Preferably, the angle bisector is substantially perpendicular to the tangent to the trailing edge delimiting line.

Optionally, the trailing edge of the rotor blade may at least in certain portions be arranged non-parallel to a pitch axis of rotation of the rotor blade. Consequently, the angle bisector of at least some of the serrations of the plurality of serrations does not have to be perpendicular to the pitch axis of rotation.

The invention claimed is:

1. A wind turbine rotor blade, comprising:
a leading edge, a trailing edge, a rotor blade root, a rotor blade tip, a suction side, a pressure side, a rotor blade length, a profile depth, and a pitch axis of rotation,
the profile depth decreasing along the rotor blade length from the rotor blade root to the rotor blade tip,
the trailing edge having a trailing edge delimiting line that replicates a contour of the trailing edge,
the trailing edge having a plurality of serrations configured to improve flow behavior at the trailing edge,
the plurality of serrations, respectively, having a serration tip, two serration edges, and an angle bisector,
the two serration edges being non-parallel to a direction of an anticipated incident flow, wherein the direction of the anticipated incident flow is perpendicular to the pitch axis of rotation,
the two serration edges being non-perpendicular to a tangent to the trailing edge delimiting line,
the trailing edge delimiting line having a plurality of portions, at least one of the plurality of portions extending non-parallel to the pitch axis of rotation,
wherein the angle bisector of each serration is non-perpendicular to the pitch axis of rotation,
wherein the angle of the angle bisector to the tangent to the trailing edge delimiting line is 90°,
wherein the trailing edge has a serration trailing edge delimiting angle, the serration trailing edge delimiting angle being defined by one of the serration edges of the two serration edges and a direction of the anticipated incident flow, wherein the direction of the anticipated incident flow is normal to the trailing edge delimiting line,
wherein the serration trailing edge delimiting angle is less than 90,
wherein first serration edges of the two serration edges face the rotor blade root,
wherein second serration edges of the two serration edges face the rotor blade tip, and
wherein the serration trailing edge delimiting angle:
increases in a first direction from the rotor blade root toward the rotor blade tip at the first serration edges;
decreases in a second direction from the rotor blade root toward the rotor blade tip at the second serration edges; or
both increases in the first direction from the rotor blade root toward the rotor blade tip at the first serration edges and decreases in the second direction from the rotor blade root toward the rotor blade tip at the second serration edges.

2. The wind turbine rotor blade according to claim 1, wherein the serration trailing edge delimiting angle is variable along the rotor blade length.

3. The wind turbine rotor blade according to claim 1, wherein the trailing edge has a serration pitch angle, wherein the serration pitch angle is defined at a predetermined position on the trailing edge delimiting line by a tangent.

4. The wind turbine rotor blade according to claim 1, wherein the plurality of serrations or the two serration edges of each of the plurality of serrations are arranged asymmetrically with each other along the rotor blade length.

5. The wind turbine rotor blade according to claim 1, wherein the trailing edge delimiting line at least partially extends in a curved manner over the rotor blade length.

6. The wind turbine rotor blade according to claim 1, wherein improved flow behavior at the trailing edge is exhibited by a reduction in turbulences at the trailing edge.

7. The wind turbine rotor blade according to claim 1, wherein the serration trailing edge delimiting angle is less than 45°.

8. A wind turbine comprising:
a tower;
a rotor; and
at least one wind turbine rotor blade according to claim 1 coupled to the rotor.

9. A method comprising:
producing a wind turbine rotor blade that has a plurality of serrations at a trailing edge, wherein the producing comprises:
forming the trailing edge to have a trailing edge delimiting line that replicates a contour of the trailing edge,
calculating geometry of each serration of the plurality of serrations in dependence on the trailing edge delimiting line, each of the plurality of serrations has a serration tip, two serration edges, and an angle bisector,
calculating a serration trailing edge delimiting angle that is defined by a local anticipated incident flow and a serration edge of the two serration edges for each of the plurality of serrations, wherein the local anticipated incident flow is defined as a normal to the trailing edge delimiting line, wherein:
the serration trailing edge delimiting angle is less than 90°,
each of the two serration edges are provided non-parallel to a direction of the local anticipated incident flow that is perpendicular to the pitch axis of rotation,
each of the two serration edges are non-perpendicular to a tangent to the trailing edge delimiting line,
the trailing edge delimiting line has a plurality of portions, at least one of the portions extending non-parallel to the pitch axis of rotation,
the angle bisector of each serration is non-perpendicular to the pitch axis of rotation,
wherein the angle of the angle bisector to the tangent to the trailing edge delimiting line is 90°, and
wherein the serration trailing edge delimiting angle:
increases in a first direction from the rotor blade root toward the rotor blade tip at the first serration edges;
decreases in a second direction from the rotor blade root toward the rotor blade tip at the second serration edges; or
both increases in the first direction from the rotor blade root toward the rotor blade tip at the first serration edges and decreases in the second direction from the rotor blade root toward the rotor blade tip at the second serration edges.

10. The method according to claim 9, wherein at least one of:
- a direction of the local anticipated incident flow is considered to be normal to a pitch axis of the wind turbine rotor blade,
- the plurality of serrations are aligned normal to a pitch axis of the wind turbine rotor blade, and
- calculating a serration pitch angle between a pitch axis of the wind turbine rotor blade and a serration edge corresponds to the angle of a tangent at a position of the trailing edge.

\* \* \* \* \*